P. H. ROOT.
LAWN MOWER GRINDER.
APPLICATION FILED MAR. 13, 1908.
908,142.
Patented Dec. 29, 1908.
3 SHEETS—SHEET 3.
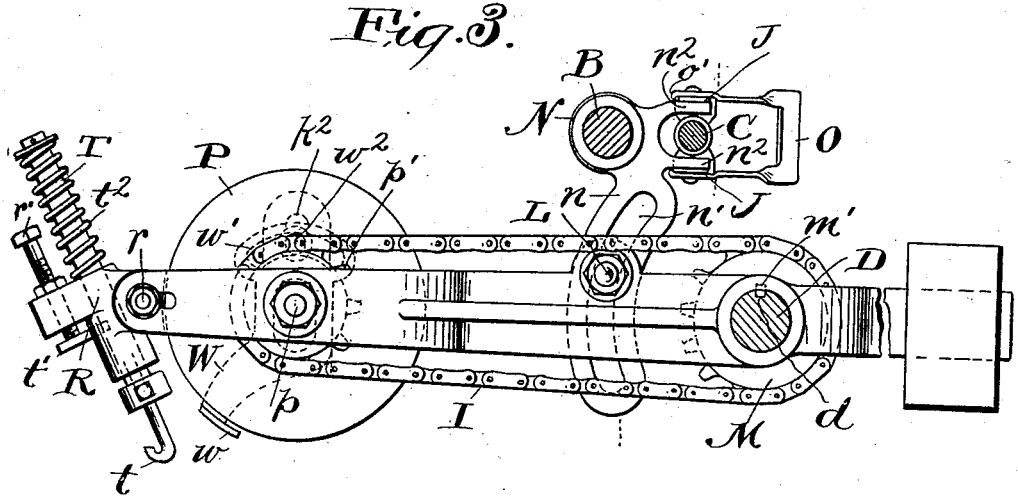
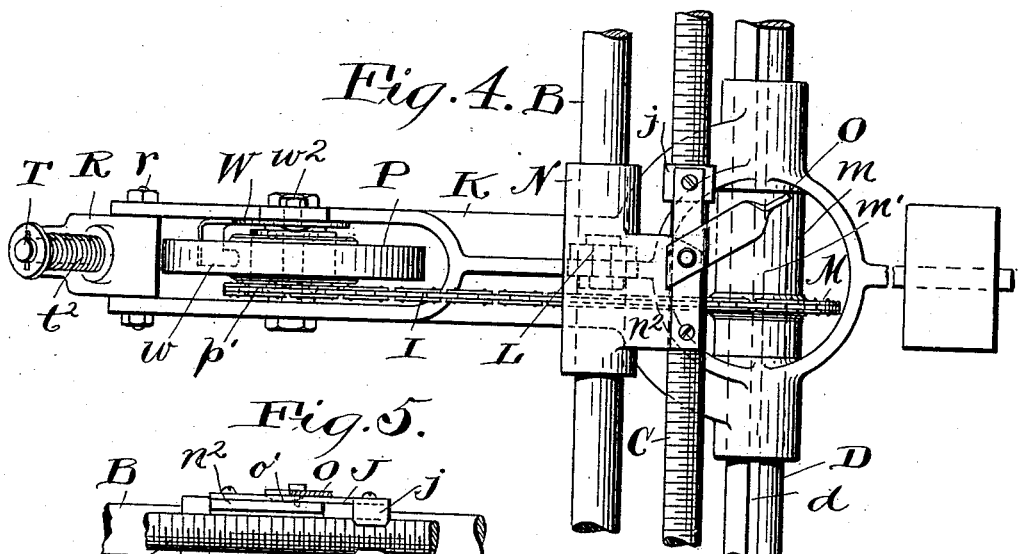
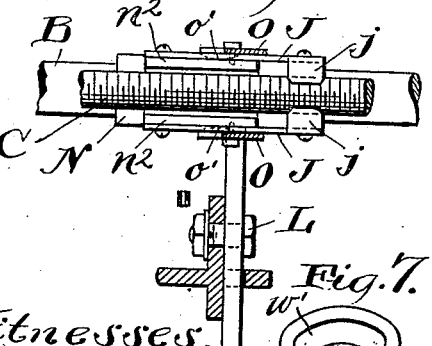
Witnesses
E. B. Gilchrist
H. R. Sullivan
Inventor
Percy H. Root
By Thurston Woodward
attorneys

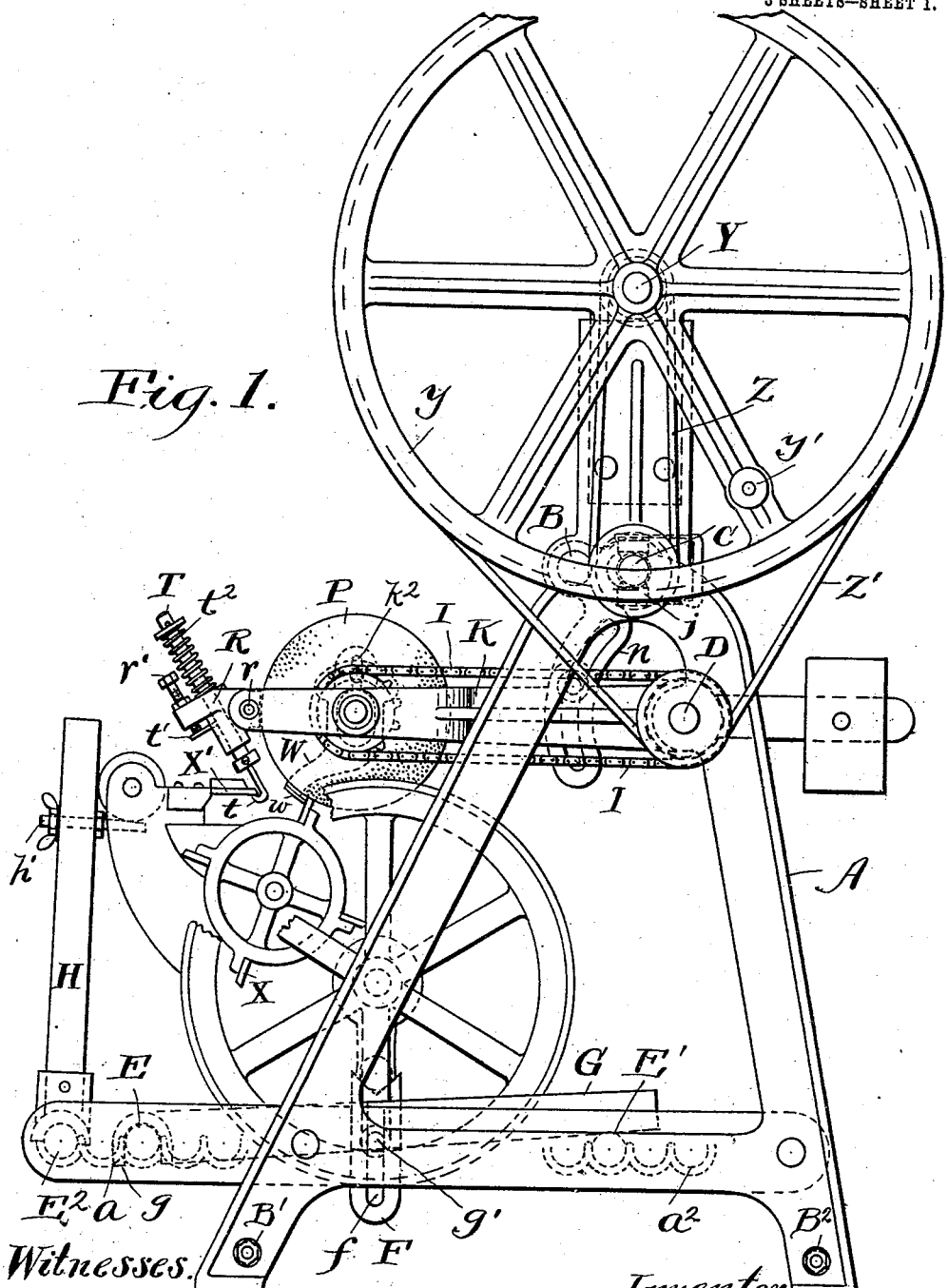

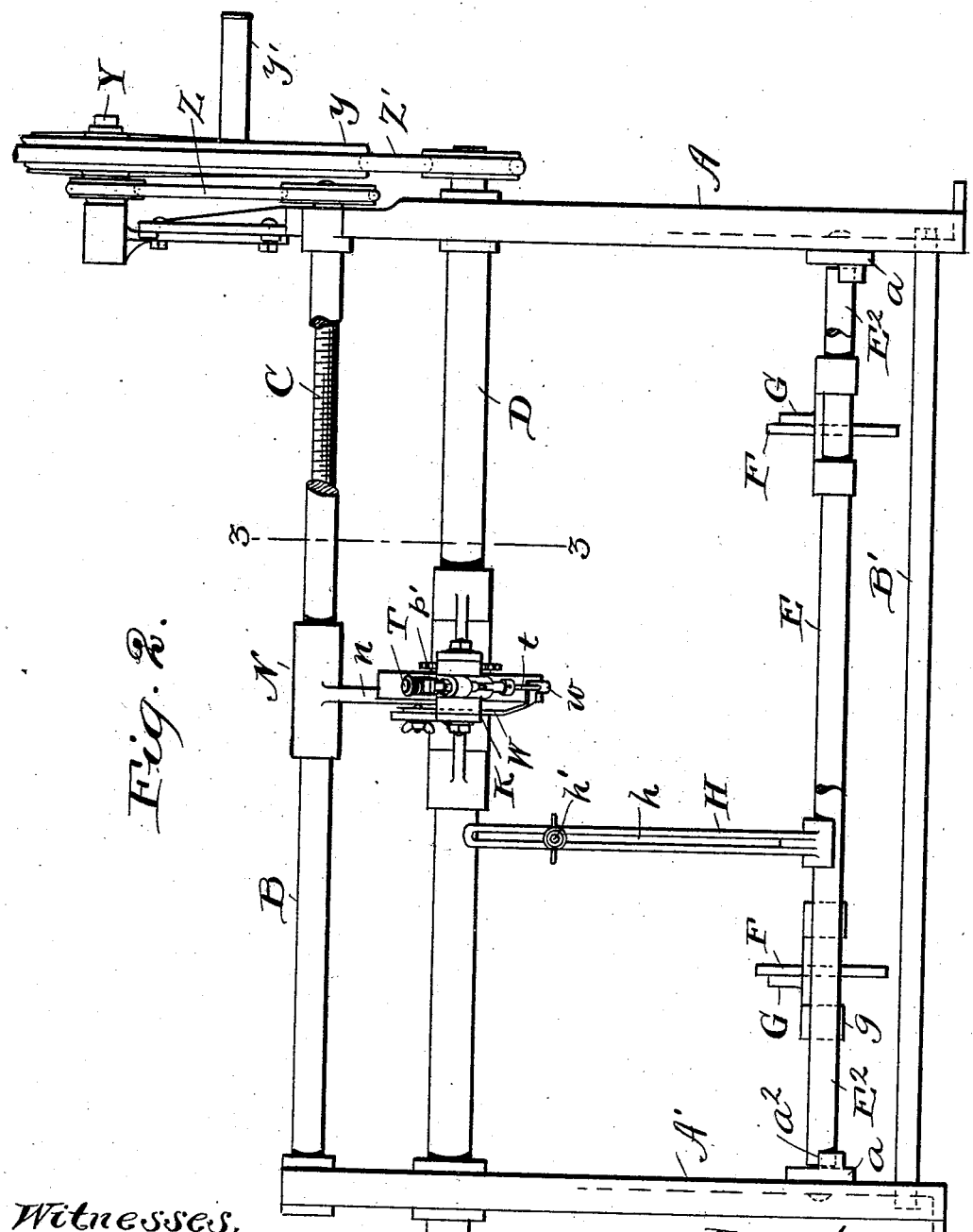

UNITED STATES PATENT OFFICE.

PERCY H. ROOT, OF PLYMOUTH, OHIO, ASSIGNOR TO THE ROOT BROTHERS COMPANY, OF PLYMOUTH, OHIO, A CORPORATION OF OHIO.

LAWN-MOWER GRINDER.

No. 908,142.  Specification of Letters Patent.  Patented Dec. 29, 1908.

Application filed March 13, 1908. Serial No. 420,769.

*To all whom it may concern:*

Be it known that I, PERCY H. ROOT, a citizen of the United States, residing at Plymouth, in the county of Richland and State of Ohio, have invented a certain new and useful Improvement in Lawn-Mower Grinders, of which the following is a full, clear, and exact description.

The object of the invention, generally stated, is to provide a practical and not expensive machine adapted to be used by any person of ordinary intelligence for sharpening the spiral reel knives of a lawn mower.

The special objects of the invention are to provide means by which, when the spiral reel knives are sharpened they will be ground to fit the stationary knife with which they coöperate; and to provide means by which the machine is easily adjusted to use with lawn mowers of various sizes etc.

The invention consists in the combinations of parts hereinafter described and pointed out in the claims.

In the drawings, Figure 1 is an end view of a machine embodying the invention. Fig. 2 is a front elevation of said machine. Fig. 3 is a sectional end view in the plane indicated by line 3—3 on Fig. 2. Fig. 4 is a plan view of the arm in which the grinding wheel is mounted and of certain parts associated therewith. Fig. 5 is a rear view of the feed screw and the mechanism through which it is operatively connected with the arm carrying the grinding wheel. Fig. 6 is a plan view of the bar G; and Fig. 7 is a detached view of the finger plate W.

The frame of the machine consists of two end members A, A', and three horizontal rods B, B', B², which rigidly connect them together. An arm $a$ projects forward from each of the end frame members, and on the inner faces of each of said arms and of the alined lower part $a'$ of each end frame member are a plurality of cup-shaped sockets $a^2$. Rods E and E' which extend from one end frame member to the other may be supported at their ends in these sockets in any position required relative to the front and back of the machine.

Two bars G are each provided at its front end with an inverted socket $g$ which may partially embrace the front rod E and be supported thereby. The rear end of each of these bars will rest upon and be supported by the rod E'. A bar F having a suitable notch in its upper end is adjustably secured to each of these bars G by means of a set bolt $g'$ screwed into the bar G and passing through a vertical slot $f$ in the bar F. The notches are to receive the spacing bar of a lawn mower. By suitably placing the two bars G, G, and the rods E, E' by which they are supported and by suitably adjusting the bars F the notched upper ends of these latter bars may be brought into proper position to support the lawn mower to be sharpened in proper relation to the grinding wheel. A vertical support H has a forked lower end to straddle and embrace a rod E² which is supported in some of the front sockets $a^2$. There is a vertical slot $h$ in this support H in which a supporting pin $h'$ is adjustably secured at such a suitable elevation that its rearwardly projecting end may go beneath and support the wood roller of the lawn mower.

A feed screw C is mounted in bearings in the end frame members adjacent to the upper rod B. A parallel shaft D is also mounted in the bearings in the end frame members. An arm K is hung on the shaft D and freely movable lengthwise thereof. The part thereof which embraces the shaft is forked, and between the two forks is the long hub $m$ of a sprocket wheel M, which hub embraces the said shaft. This hub has a feather $m'$ which engages with a longitudinal groove or keyway $d$ in the shaft D. It may move longitudinally of the shaft D with the arm K, but it must also rotate with shaft D. A shaft $p$ carrying the grinding wheel P is mounted in the forked front end of the arm K; and a sprocket wheel $p'$ is fixed to said shaft. A sprocket chain I transmits motion to the shaft $p$ from the sprocket wheel M. On a rearward extension of the arm K is an adjustable counterweight, which should overbalance the front end of said arm.

A block R lies between the front forks of the arm K and is pivoted thereto by a bolt $r$. By tightening the nuts on this bolt this block R may be clamped to the arm K in any desired position relative thereto. In this block is a cylindrical pin T, to the lower end of which a hook $t$ is secured. A spring $t^2$ acts to thrust this pin T upward as far as it can go,—this movement being limited by finger $t'$ which is fixed to pin T and engages with a set screw $r'$ carried by the block R. A hook $t$ is secured to the lower end of this pin, which hook is to engage with the lower surface of the straight knife X' of a lawn mower which is supported in the machine in the manner specified.

A finger frame W loosely embraces the shaft $p$ of the grinding wheel between said wheel and one fork of the arm K. This frame has a laterally bent finger $w$ which extends across the face of the grinding wheel and is adapted to engage with one of the spiral reel knives, and to thereby turn the knife reel as required to hold the spiral knife always against the grinder, as the grinder is moving transversely of the machine. This frame has an arcual slot $w'$, and the arm K has a vertical slot $k^2$. A set bolt $w^2$ passing through these slots serves to connect this frame with the arm K at any desired position. This adjustment is provided to adapt the machine for use with grinding wheels of various sizes and with lawn mowers of various sizes.

A sleeve N embraces and slides upon the rod B. It has a downwardly extended bracket arm $n$, in which is an arcual slot $n'$ of which the shaft D is the center. A bolt L passes through this slot and through a hole in bar K. By means of a nut on this bolt the bracket $n$ and bar K may be rigidly clamped together when required. Generally it is preferable that they should not be clamped together, but the nut should only be so close to the bracket $n$ that the bar K must move crosswise of the machine when the sleeve N is so moved. Under such conditions the counterbalanced bar K is free to work as required by the engagement of the hook $t$ with the straight lawn mower knife.

Any suitable disengageable connection between sleeve N and the feed screw C may be employed. The construction shown is well adapted to this purpose. The sleeve N has two rearwardly extended arms $n^2$ which lie one above and one below the feed screw. Springs J are attached to these arms,—and each carries a nut section $j$ for engagement with the feed screw. Normally the spring holds the nuts out of engagement, but they may be thrown in by the action of a two arm lever O, pivoted to the arms $n^2$ by pivot screws which pass through loose holes in the springs. These lever arms have cam projections O' which, when the lever is turned, engage with said springs and force them toward the feed screw and cause the nuts to engage therewith.

Any suitable driving mechanism may be provided. As shown, a short shaft Y is mounted in an upward extension of one of the end frame members; and carries a fly wheel $y$ with a crank handle $y$. Belts Z, Z' transmit motion from this shaft to the feed screw C and shaft D.

In using this machine a lawn mower is put in with its space bar resting upon the notched bars F and the front roller of the lawn mower resting upon the pin J. The mower reel is therefore free to rotate. The arm K is then moved over to one end of the machine and its front end swung down so as to bring the surface of the grinding wheel into contact with one of the spiral knives of the lawn mower to be ground. Then the pin T is turned in block R and pushed downward so as to carry the hook past the straight knife X' of the lawn mower. It is then turned around so that the hook catches under said straight knife. The set screw $r$ is adjusted so that the grinding wheel is drawn with suitable force against the spiral knife X to be ground. The machine is now set in operation. The arm K will move across the machine and the grinding wheel will rotate. If there is any unevenness or crookedness of the straight knife, it is, of course, necessary that the spiral knives shall be ground with corresponding unevenness; and obviously, with the machine shown, the arm K will be drawn up and down by any unevenness in the straight knife through its engagement with the hook $t$. And since the hook $t$ is in substantially the same vertical plane as the grinding wheel, each spiral knife will be ground complementarily to the knife X.

Having described my invention, I claim:

1. In a lawn mower grinder, the combination of a swinging arm, a grinding wheel rotatably mounted therein, a hook carried by said arm and adapted to engage with the under face of the straight knife of a lawn mower, mechanism for turning said grinding wheel, mechanism for moving said arm crosswise of the machine, and a finger secured to said arm for engagement with the spiral reel knives of a lawn mower.

2. In a lawn mower grinder, the combination of a rotatable shaft, a counterbalanced arm hung on said shaft and capable of moving lengthwise thereon, a grinding wheel rotatably mounted in said arm, means transmitting rotary motion from said shaft to the grinding wheel, and a hook carried by said arm and adapted to engage with the under face of the straight knife of a lawn mower and to thereby hold a reel knife of said lawn mower in proper position to be engaged by said grinding wheel.

3. In a lawn mower grinder, the combination of a rotatable shaft, a counterbalanced arm hung on said shaft and capable of moving lengthwise thereon, a grinding wheel rotatably mounted in said arm, means for rotating the grinding wheel, a block adjustably secured to said arm, a spring-actuated pin movable endwise through said block, and a hook carried by said pin.

4. In a lawn mower grinder, the combination of a rotatable shaft, a counterbalanced arm hung on said shaft and capable of moving lengthwise thereon, a grinding wheel rotatably mounted in said arm, means transmitting rotary motion from said shaft to the grinding wheel, a block adjustably secured to said arm, a spring-actuated pin movable endwise through said block, a hook carried by said pin, a set screw adjustable in said block, and a projection on said pin for engagement therewith.

5. In a lawn mower grinder, the combination of a rotatable shaft having a longitudinal key-way, an arm loosely hung on and movable longitudinally along said shaft, a sprocket wheel whose hub embraces said shaft and has a feather engaging in said key-way, a grinding wheel rotatably mounted in said arm on an axis parallel with that of the shaft, means for simultaneously moving said arm and sprocket wheel along said shaft, a sprocket wheel fixed to said grinding wheel, a sprocket chain connecting said sprocket wheels, a finger secured to said arm for engagement with a spiral reel knife of a lawn mower, and a hook carried by said arm for engagement with the straight knife of said lawn mower.

6. In a lawn mower grinder, the combination of a rotatable shaft having a longitudinal key-way, an arm loosely hung on and movable longitudinally along said shaft, a sprocket wheel whose hub embraces said shaft and has a feather engaging in said keyway and having also a sprocket wheel, a grinding wheel rotatably mounted in said arm on an axis parallel with that of the shaft, a sprocket wheel fixed to said grinding wheel, a sprocket chain connecting said sprocket wheels, a finger secured to said arm for engagement with a spiral reel knife of a lawn mower, a hook carried by said arm for engagement with the straight knife of said lawn mower, a fixed rod parallel with said shaft, a sleeve slidable thereon having a bracket arm, means connecting said arm and bracket arm so as to compel them to move lengthwise of said shaft in unison, a rotatable feed screw, and devices movably supported by said sleeve for engagement and disengagement with said feed screw.

7. In a lawn mower grinder, the combination with the machine frame, of two bars adjustably supported by said frame near the frame ends, and bars F which are respectively associated with said bars and are adjustably secured thereto, said bars having notched upper ends for the reception of the space bar of the lawn mower.

8. In a lawn mower grinder, the combination of a frame comprising end members and connecting bars, each end member having on its inner face a plurality of rod sockets, two rods extending between the end frame members and supported in said sockets, two bars resting upon said rods, and a bar F adjustably connected with each of the last mentioned bars.

9. In a lawn mower grinder, the combination of the frame, bars supported thereby and capable of being adjusted relatively to said frame, a vertically slotted bar F having a notched upper end associated with each of said bars, and set bolts passing through said slots and into said bars for adjustably securing said slotted members to said bars.

In testimony whereof, I hereunto affix my signature in the presence of two witnesses.

PERCY H. ROOT.

Witnesses:
A. F. RAMSEY,
J. A. ROOT.